J. H. PISOR.
NUT LOCK.
APPLICATION FILED NOV. 10, 1910.
1,063,211.
Patented June 3, 1913.
2 SHEETS—SHEET 1.
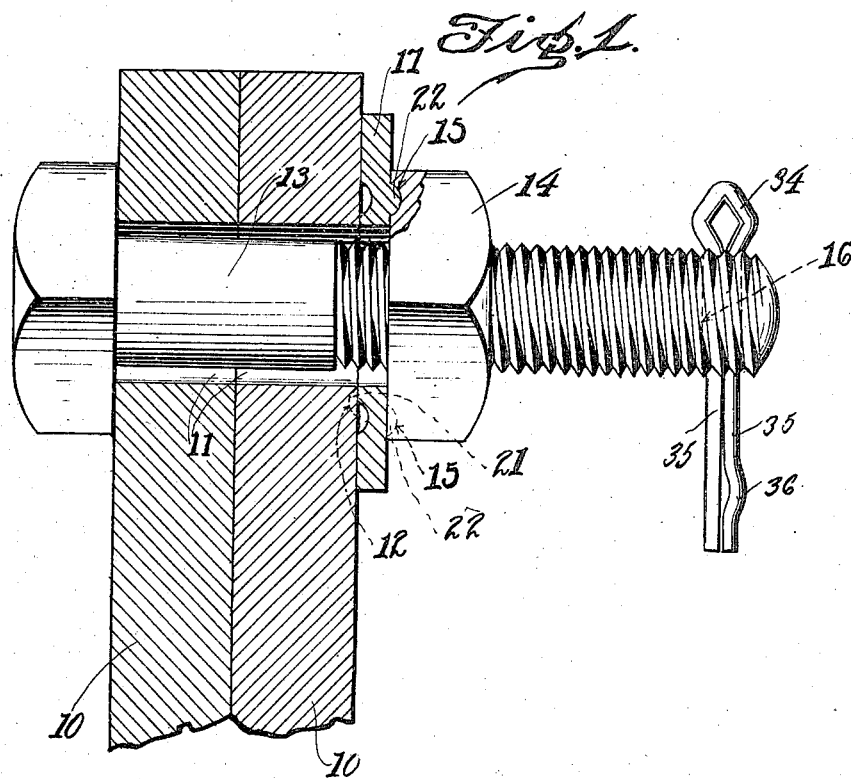
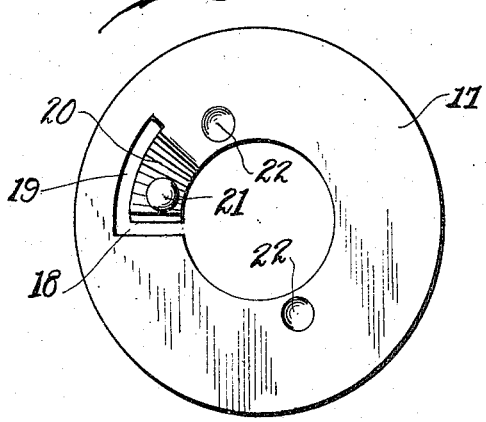
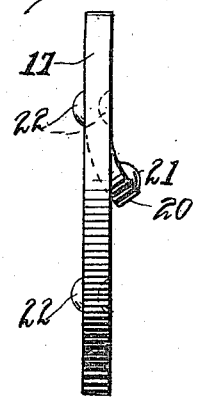
Witnesses
W. C. Fielding
L. N. Gillis
Inventor
Jacob H. Pisor.
By Chandler & Chandler
Attorneys

J. H. PISOR.
NUT LOCK.
APPLICATION FILED NOV. 10, 1910.

1,063,211.

Patented June 3, 1913.

2 SHEETS—SHEET 2.

Witnesses
W. C. Fielding
L. N. Gillis

Inventor
Jacob H. Pisor.
By
Attorneys

UNITED STATES PATENT OFFICE.

JACOB H. PISOR, OF LIVINGSTON, MONTANA, ASSIGNOR OF ONE-HALF TO HENRY J. WALCOTT, OF LIVINGSTON, MONTANA.

NUT-LOCK.

1,063,211.  Specification of Letters Patent.  Patented June 3, 1913.

Application filed November 10, 1910. Serial No. 591,612.

*To all whom it may concern:*

Be it known that I, JACOB H. PISOR, a citizen of the United States, residing at Livingston, in the county of Park, State of Montana, have invented certain new and useful Improvements in Nut-Locks; and I do hereby declare the following to be a full, clear, and exact description of the invention, such as will enable others skilled in the art to which it appertains to make and use the same.

This invention relates to bolts and nuts and has special reference to a means for holding a nut in proper position on a bolt when the same is applied thereto.

The principal object of the invention is to provide a novel form of locking washer for use in connection with devices of this character.

A second object of the invention is to provide a novel form of cotter pin for use in connection with devices of this character.

With the above and other objects in view the invention consists in general of certain novel details of construction and combinations of parts hereinafter fully described, illustrated in the accompanying drawings and specifically set forth in the claims.

Figure 4:
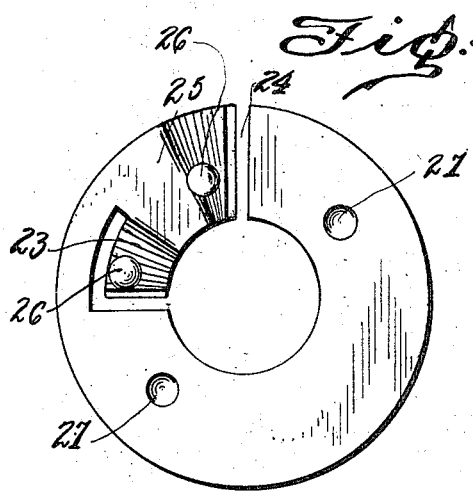
Figure 5:
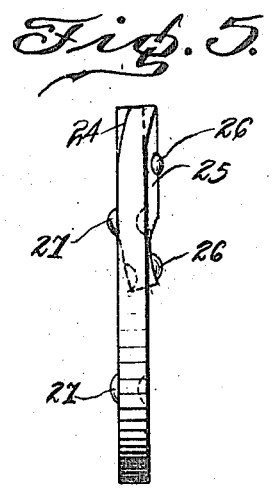
Figure 6:
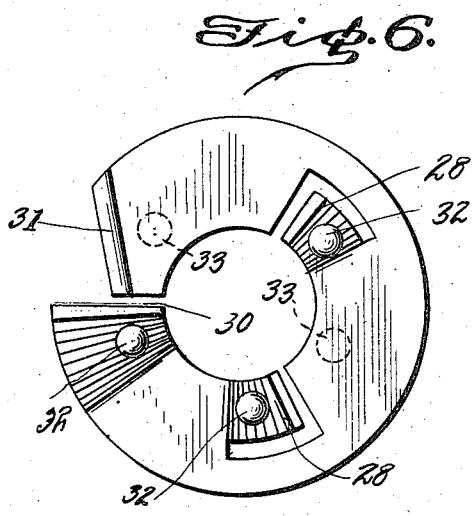
Figure 7:
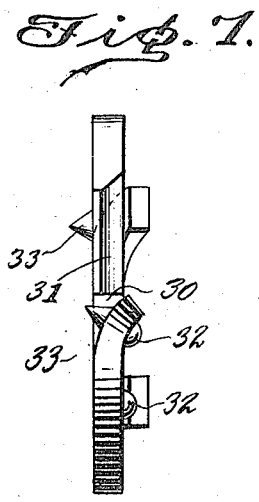
Figure 8:
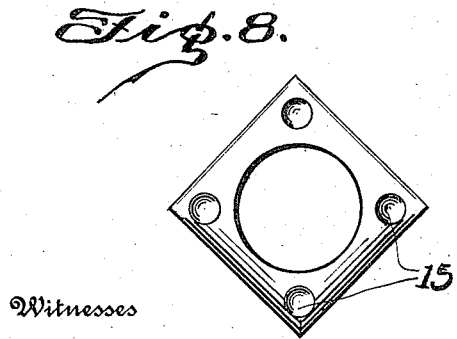
Figure 9:
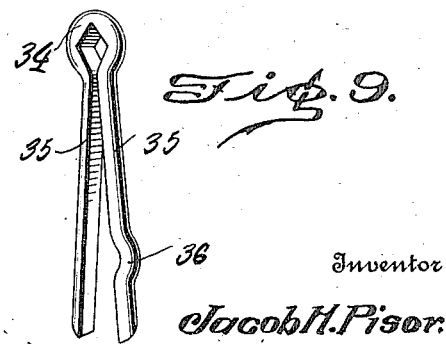

In the accompanying drawings, like characters of reference indicate like parts in the several views, and Figure 1 is a sectional view through a pair of plates bolted together, the bolt being provided with the improved washer and cotter pin, Fig. 2 is a view showing one face of an improved washer constructed in accordance with this invention, Fig. 3 is an edge view of the improved device, Fig. 4 is a modified form of washer viewed from one face, Fig. 5 is an edge view of the modified form shown in Fig. 4, Fig. 6 is a further modification of the washer, Fig. 7 is an edge view of the modification shown in Fig. 6, Fig. 8 is a view of the under side of a nut as prepared for use with either of the forms of washer, Fig. 9 is a view of the cotter pin.

Referring particularly to Fig. 1 there is therein illustrated a pair of plates 10 provided with suitable bolt-receiving openings 11. One of these plates is provided also with one or more depressions 12 formed adjacent the respective bolt-receiving opening. Through the openings extends a bolt 13 upon which is screwed a nut 14 having depressions 15 on its underface similar in shape to the depressions in the plates. This bolt is also provided with cotter pin openings or holes 16.

The washer used in connection with the invention is indicated in general at 17 and in each instance this washer is of the usual annular form and is made from a sheet metal plate having a substantial degree of resiliency.

In the form of washer illustrated in Figs. 2 and 3 the washer is cut by means of a radial slit 18 and a second slit 19 arranged at an angle to the radial slit so that a tongue 20 is provided which is partially severed from the material of the body of the washer. On this tongue 20 is a projection 21 which extends toward the nut when the device is applied while from the opposite face of the washer extend projections 22.

In the form of device shown in Figs. 4 and 5 there is provided a tongue 23 formed in a manner similar to the tongue of the previously described washer and in addition to this the washer is slitted through radially as shown at 24 and is provided with a slightly upturned end 25. This end and the tongue previously described form substantially a pair of tongues. On the tongue and also on the end 25 are projections 26 both extending from the same face. Other projections 27 are arranged to extend from the opposite face. It will be noted that the two tongues are arranged at right angles to each other.

In the form shown in Figs. 6 and 7 there are provided two tongues 28 and the washer is slit clean through as shown at 30, one edge of the portion adjacent said slit being beveled off as at 31. The tongues and body of the washer adjacent the slit are provided with projections 32 extending from one side or face of the washer while similar projections 33 extend from the opposite side or face thereof.

The cotter pin comprises the usual eye 34 from which extends a pair of legs substantially semi-circular in cross section 35 one of which is bent adjacent its extremity as at 36, the bend being arranged with its concaved side facing the remaining or straight leg so that there is formed a projection on the cotter pin intermediate its end. This cotter pin is used in the ordinary manner, the legs being normally sprung apart by the resiliency of the metal forming the pin so that when the pin is inserted in the pin hole the legs will collapse to permit the passage of the cotter pin through the hole and it will move in this collapsed position until after the projection has passed through the hole when the legs will spring apart so that the projection forms a lock to prevent accidental disengagement of the cotter pin from the pin hole.

In use the washer is placed beneath the nut and the latter screwed up. The tongues will yield during the screwing-up of the nut so that the projections can slip in and out of the recesses in the underface of the nut until the desired tension has been placed upon the bolt. When this is the case the screwing up process is stopped and the bolt will remain in position without fear of dislodgment and especially since the cotter pin is inserted immediately after screwing up the nut.

There has thus been provided a simple and efficient device of the kind described and for the purpose specified.

What is claimed is:—

1. In a nut lock, in combination, a washer comprising an annular body of resilient sheet metal having a radial slot extending partially through the annulus and a second slot disposed at an angle to the first and communicating therewith to form a tongue, said tongue curved upwardly and provided with a semi-globular projection on its upper surface, said body formed with a radial slit therethrough, one end of the body adjacent the slit being curved upwardly and also provided on its upper face with a semi-globular projection, and a nut having semi-globular recesses in its inner face for engaging the projections of the tongues and locking the nut against rotation.

2. In a nut lock, in combination, a washer comprising an annular body of resilient sheet metal having a radial slot extending partially through the annulus and a second slot disposed at an angle thereto and communicating therewith to form a tongue, said tongue curved upwardly, a semi-globular projection formed on the upper surface of the tongue, the body member formed with a radial slit, an end of the body member adjacent the slit being curved upwardly and provided on its upper surface with a semi-globular projection, the other end of the body being cut off at an angle to the radial slit and the resultant edge beveled, a nut formed with semi-globular recesses in its under surface for engaging the projections on the washer and thus locking the nut against rotation.

In testimony whereof, I affix my signature, in presence of two witnesses.

JACOB H. PISOR.

Witnesses:
HENRY J. WOLCOTT,
JOHN A. CARLSON.

---

Copies of this patent may be obtained for five cents each, by addressing the "Commissioner of Patents, Washington, D. C."